(12) United States Patent
Kleemann

(10) Patent No.: US 7,751,662 B2
(45) Date of Patent: Jul. 6, 2010

(54) OPTICAL DISPLAY DEVICE

(75) Inventor: Bernd Kleemann, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 12/358,034

(22) Filed: Jan. 22, 2009

(65) Prior Publication Data
US 2009/0245730 A1 Oct. 1, 2009

(30) Foreign Application Priority Data
Jan. 24, 2008 (DE) ........................ 10 2008 005 817

(51) Int. Cl.
*G02B 6/34* (2006.01)
(52) U.S. Cl. .......................... 385/37; 385/31
(58) Field of Classification Search ............. 385/37
See application file for complete search history.

(56) References Cited

U.S. PATENT DOCUMENTS

| | | | |
|---|---|---|---|
| 4,711,512 | A | 12/1987 | Upatnieks |
| 6,169,613 | B1 | 1/2001 | Amitai et al. |
| 6,580,529 | B1 | 6/2003 | Amitai et al. |
| 6,805,490 | B2 | 10/2004 | Levola |
| 7,139,127 | B2 | 11/2006 | Arnold et al. |
| 7,385,761 | B2 * | 6/2008 | Ohmori et al. ............... 359/569 |
| 7,630,061 | B2 * | 12/2009 | Lehre et al. ................. 356/4.01 |
| 7,633,680 | B2 * | 12/2009 | Ohmori ........................ 359/569 |
| 2002/0003661 | A1 * | 1/2002 | Nakai .......................... 359/569 |
| 2003/0081316 | A1 * | 5/2003 | Goldberg et al. ............ 359/558 |

FOREIGN PATENT DOCUMENTS

| | | |
|---|---|---|
| DE | 103 13 548 | 3/2004 |
| WO | WO 2004/025335 | 3/2004 |
| WO | WO 2006/064301 | 6/2006 |

OTHER PUBLICATIONS

Elfstrom, et al., "Fabrication of Blazed Gratings by Area-Coded Effective Medium Structures", *Optics Communications*, 266 (2006).
Kleemann, et al., "Area-Coded Effective Medium Structures, a New Type of Grating Design", *Optics Letters*, vol. 30, No. 13 (Jul. 1, 2005).
Levola, "Diffractive Optics for Virtual Reality Displays", *Journal of the SID* (May 14, 2006).
Levola et al., "Replicated Slanted Gratings with a High Refractive Index Material for in and Outcoupling of Light", *Optics Express*, vol. 15, No. 5 (Mar. 5, 2007).
Levola, Tapani, "Diffractive Optics for Virtual Reality Displays", University of Joensuu Department of Physics Academic Dissertation (Sep. 16, 2005).

\* cited by examiner

*Primary Examiner*—Sung H Pak
(74) *Attorney, Agent, or Firm*—Lempia Braidwood LLC

(57) ABSTRACT

An optical display device, in particular for use in a head-up display or a head-mounted display, comprises an essentially planar light guide, an image-generating system, a first diffraction grating by which light that comes from the image-generating system can be coupled into the light guide, and a second diffraction grating, by which the light can be coupled out again from the light guide. At least one of the two diffraction gratings is a binary-blazed grating having a multiplicity of diffraction structures, which are composed of a multiplicity of individual substructures that ensure a blaze effect and in plan view have the shape of a closed geometrical surface.

7 Claims, 2 Drawing Sheets

OPTICAL DISPLAY DEVICE

RELATED APPLICATION DATA

This patent is based on German patent application 10 2008 005 817.3 filed Jan. 24, 2008. This patent claims priority benefit of this prior filed German application, which is hereby incorporated by reference in its entirety.

BACKGROUND OF THE INVENTION

1. Field of the Invention

The invention relates to an optical display device which is suitable in particular for use in a head-up display or a head-mounted display, such as are known for example from entertainment electronics, in order to increase the exit pupil of an image-generating system by means of diffractive elements.

2. Description of the Prior Art

Currently, in the field of man-machine interfaces, principles and devices are increasingly being developed by which computer-enhanced information of the real experiential world can be transmitted to humans. So-called augmented or virtual reality displays (VRD) are an example of this. Such displays, which may for example be configured similarly to spectacles as a head-mounted display (HMD), superimpose the image of an image-generating system, for example a micro-display, with the observer's view of the real world.

Such a head-mounted display may, for example, be produced by directing the light of an image-generating system onto a planar transparent light guide and coupling it into the light guide through a diffraction grating, the so-called input grating. The light then travels along the light guide to a so-called output grating, by which the light is coupled out again in the direction of the eye. Since the light guide is transparent, the light coupled out is superimposed with the light from the real world, which strikes the opposite side of the light guide from the eye, and is therefore focused together with it onto the retina in the observer's eye. By means of the gratings, which are also referred to as holographic optical elements (HOEs), the exit pupil of the micro-display is also enlarged and adapted to the field of view of the eye. Furthermore, planar light guides and the gratings may be configured binocularly or monocularly, depending on whether or not the input grating is provided in two parts and a second output grating is provided.

Such plane-plate HMDs are known for example from U.S. Pat. No. 6,805,490B2, which shows how such a plane-plate HMD can be produced from a plurality of layers or a plurality of subplates, so that light with a different wavelength can be used.

Since the light of the image-generating system strikes one of the flat sides of the light guide perpendicularly, in order to be coupled into the planar light guide of the HMD it must be deviated so strongly at the gratings that the angle of the light with respect to the interfaces of the planar light guide is greater than the angle of total reflection. The same applies correspondingly in the converse case of coupling out.

In order to guide as much light as possible into a particular diffraction order, so-called blaze gratings are normally used which have a sawtooth profile and, by suitable parameter selection, concentrate a majority of the light in one diffraction order by the combination of refraction and diffraction effects. A characteristic quantity of such a blaze grating is the diffraction efficiency, i.e. the fraction of light which is guided into the selected order. In order to ensure an acceptable luminous efficiency of HMDs which are usually configured as mobile devices, however, the gratings used for coupling in and out must achieve a very high diffraction efficiency.

For manufacturing reasons, the gratings used in HMDs are usually surface gratings, the diffraction efficiency of which depends essentially on the profile shape of the grating. Owing to shadowing effects, which occur with the small grating widths that are required in order to achieve the strong deviation, conventional blaze gratings are unsuitable for use in plane-plate HMDs. Binary gratings, which have an input and output efficiency of at best 30 percent, are likewise not an optimal solution. So-called oblique gratings have therefore hitherto been used, although these are relatively expensive to produce.

SUMMARY OF THE INVENTION

It is therefore an object of the invention to provide such an optical display device with which the light can both be coupled into the plane plate of the light guide with the highest possible diffraction efficiency by the input grating and coupled out again homogeneously by the output grating. The optical display device should furthermore be simple and economical to produce.

This object is achieved according to the invention by an optical display device having the features of claim 1. Other advantageous configurations of the invention may be found in dependent claims 2 to 6.

Since the gratings specified in the claims, referred to below as BLACES gratings, have a diffraction efficiency of between 65% and 75% over a large incidence range, they are very suitable for coupling light into a plane plate. A particular advantage is that BLACES gratings can be produced very simply compared with oblique gratings.

For example, production may be envisaged in which a quartz glass template is generated by means of electron beam lithography or another suitable technology for each grating type required on the planar light guide. Such a template can currently be manufactured with a size of up to $25 \times 25$ mm$^2$, which is sufficient for the input and output gratings of HMDs. In a subsequent step, the structure of the grating is printed onto the light guide as liquid resist by means of NanoImprint technology using the template, similarly to conventional letterpress printing. After UV curing, the template is then removed vertically upwards. With corresponding manufacture, such a template can be used for 10,000 to 25,000 such replications, and in most cases even in another such cycle after corresponding cleaning. Particularly with a view to the application of HMDs in the entertainment electronics sector, the reduction in production costs thereby achievable is of great importance.

Another possibility for producing such a BLACES grating is direct photolithographic transfer of a mask onto the substrate. In this way, if the profile depth of all the gratings is the same, all the gratings could be transferred onto the planar light guide of the HMD in a single working step.

BRIEF DESCRIPTION OF THE DRAWINGS

Other features and advantages of the invention may be found in the following description of exemplary embodiments with the aid of the drawings, in which.

DESCRIPTION OF PREFERRED EXEMPLARY EMBODIMENTS

Figure 1:
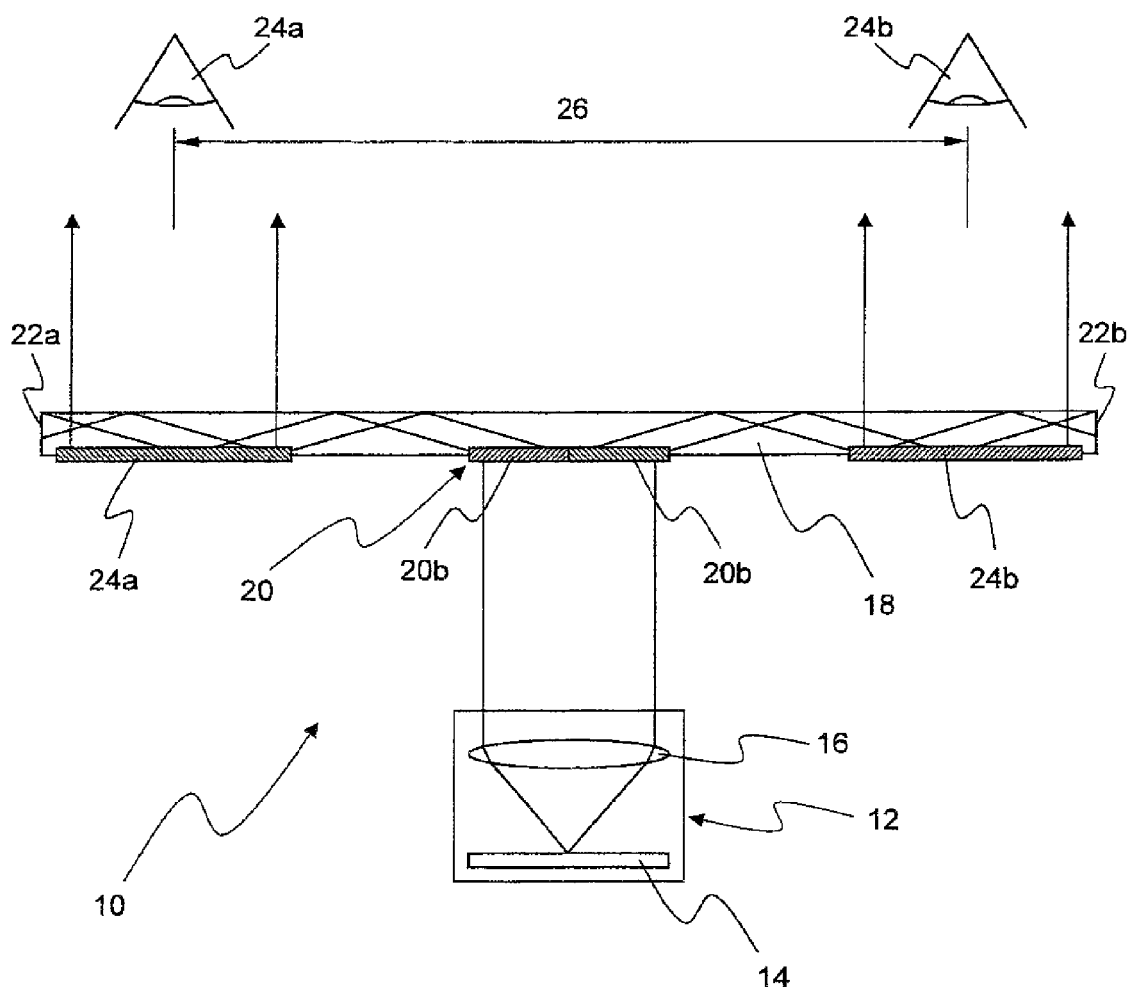
FIG. 1 shows a schematic front view of a head-mounted display based on a plane plate.

FIG. 1 shows an optical display device 10 in a highly schematised representation, which may be used for example in so-called head-mounted or head-up displays. The optical display device 10 comprises a micro-display 12, which directs the image of an image-generating system 14 through optics 16 onto the middle of a flat side of an essentially plane-parallel plate 18. The imaging system 14 may, for example, be provided by a liquid-crystal display (LCD) or by arrangements of light-emitting diodes (LEDs) or organic light-emitting diodes (OLEDs), such as are known from in particular from the field of entertainment electronics.

The light generated by the image-generating system 14 then strikes a grating 20 applied in or on the plane-parallel plate 18, which couples the light into the plane-parallel plate 18 by means of diffraction along it. The grating constant g of the grating 20 is selected so that the light is coupled into the plane-parallel plate 18 at an angle which is greater than the angle of total reflection at the boundary layer between the plane-parallel plate 18 and the medium surrounding it. The plane-parallel plate 18 therefore acts as a light guide, in which the light is reflected to and fro between the two opposite surfaces of the plane-parallel plate 18.

Since the grating 20 is a grating which exhibits a blaze effect, i.e. a particular diffraction order is favoured with a particular diffraction efficiency which is as high as possible, and the grating 20 is subdivided into a left grating subregion 20a and a right grating subregion 20b with opposite blaze effects, half of the light coming from the image-generating system 14 is respectively guided to the left and right along the plane-parallel plate 18.

The light travelling to the ends 22a and 22b of the plane-parallel plate 18 is then coupled respectively by a left and right output grating 24a and 24b, which gratings are arranged with the inter-ocular spacing 26 on the plane-parallel plate 18, out of the latter in the direction of the left and right eyes 26a and 26b. In conjunction with the input and output gratings 20a, 20b, 24a, 24b, the optics 16 generate a virtual image of the object represented on the image-generating system 14, which is imaged by the two eyes 26a, 26b onto the retina as a real image. By additional optical elements or additional so-called expander gratings, which may be arranged between the input and output gratings 20a, 20b, 24a, 24b, the exit pupil of the optical display device 10 can be increased further.

Figure 2:
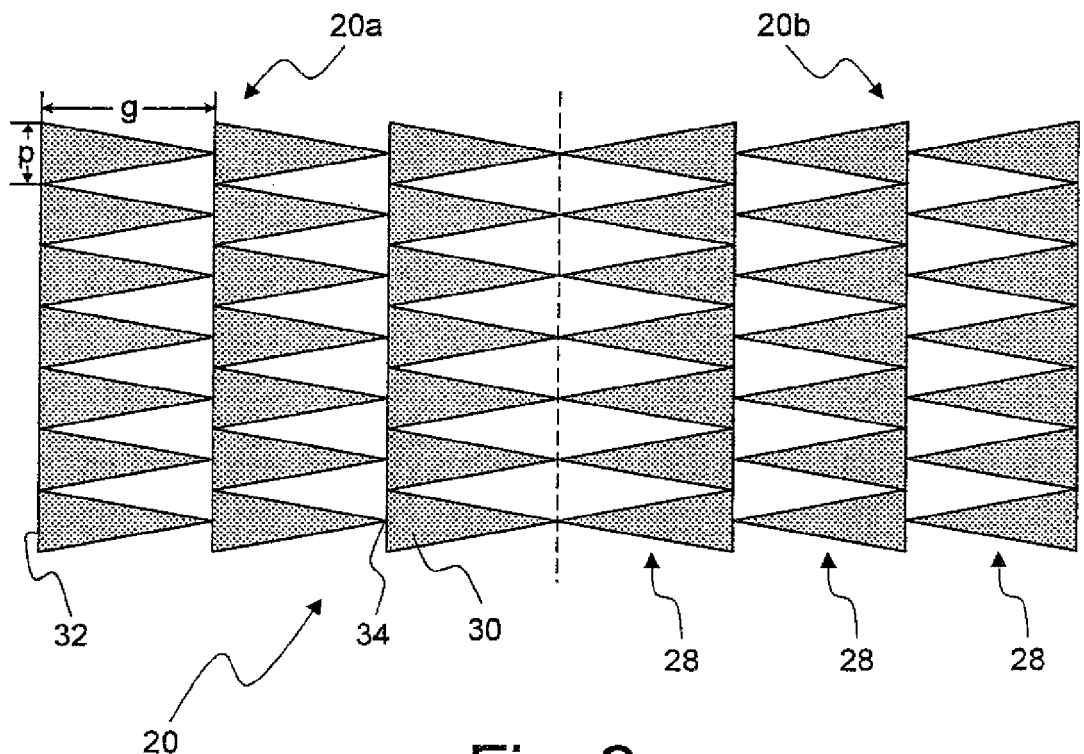
FIG. 2 shows a schematic view of the central part of a BLACES grating for coupling light into the plane plate.

FIG. 2 shows a simplified representation of a central excerpt of the input grating 20. The grating 20 shown is a so-called "blazed area-coded effective medium structures" or BLACES grating, as described in WO 2004/02 5335 A1. Such a blazed grating has a multiplicity of diffraction structures 28 extending parallel and in a straight line, three of which are respectively shown in the drawing as excerpts for the two oppositely acting grating subregions 20a and 20b. The diffraction structures 28 have a width g perpendicular to their lengthwise direction. Since the diffraction structures 28 of the exemplary embodiment shown abut one another directly, this width g corresponds to the conventional grating constant of a grating. As is known of conventional optical gratings, the grating constants g must be of the order of the effective wavelength $\lambda$ of the light for which the optical grating is used, so that the diffraction effects can take place.

Furthermore, the grating constant g must always be greater than the effective wavelength $\lambda$ of the light, since the light no longer perceives structures which are smaller than its wavelength as structuring. This is because, depending on the fill factor between the structures and the surroundings, such structures in the subwavelength range essentially act in the same way as a homogeneous optical material that has an effective refractive index which is obtained as a mixed value between the refractive index of the structures and the surroundings, depending on the fill factor. As will become clear below, the BLACES gratings exploit precisely this effect.

Each diffraction structure 28 is composed in turn of a multiplicity of directly adjacent individual substructures 30, each of which has the form of a prism with a triangular base surface and a height h. As may be seen from FIG. 2, such a base surface of an individual substructure 30 has the shape of an isosceles triangle, the base side 32 of which forms a continuous line with neighbouring individual substructures 30. The length p of such a base side 32 is less than the effective wavelength $\lambda$ of the light being used. The apex 34 of the triangle, where the smallest angle is formed, abuts the base side 32 of the base surface of an individual substructure 30 of the neighbouring diffraction structure 28.

In this way, diffraction structures 28 are obtained which are bounded on one side by a plane vertical surface and on the other side by a comb-shaped lateral structure. The two grating subregions 20a and 20b differ by an opposite orientation of the comb-shaped lateral structure of the diffraction structures 28.

Since all the dimensions of the individual substructures 30 along the lengthwise direction of the diffraction structures 28 are less than the length p of the base side 32, and this in turn is less than the effective wavelength $\lambda$ of the light being used, the light perceives the comb-shaped lateral structure, composed of the individual prisms, of the diffraction structures 28 as a refractive index profile varying with a sawtooth shape perpendicularly to the diffraction structures 28. The effect of such a grating 20 therefore corresponds to that of a conventional blaze grating which favours diffraction into a selected diffraction order by suitable tuning of the sawtooth refractive index profile, the grating constant g and the wavelength $\lambda$. By modifying the shape of the lateral structure, i.e. the base surface of the individual substructures 30, a person skilled in the art can furthermore readily influence the diffraction efficiency and other characteristics of the grating 20 according to the respective requirement of the application.

For example, when coupling the light out, a homogeneous intensity of the light coupled out is desired along the plane-parallel plate 18 since this light is delivered directly into the eye 26a, 26b. Since the light reflected at the interfaces of the plane-parallel plate 18 strikes the output gratings 24a, 24b repeatedly along this plate, and the intensity after each individual output coupling caused by diffraction decreases along the plane-parallel plate 18, the output gratings 24a, 24b must have an arrangement such that the output efficiency increases with an increasing distance from the input grating 20. The grating constant g must remain constant, however, in order to maintain diffraction in the direction of the eyes 26a, 26b.

Figure 3:
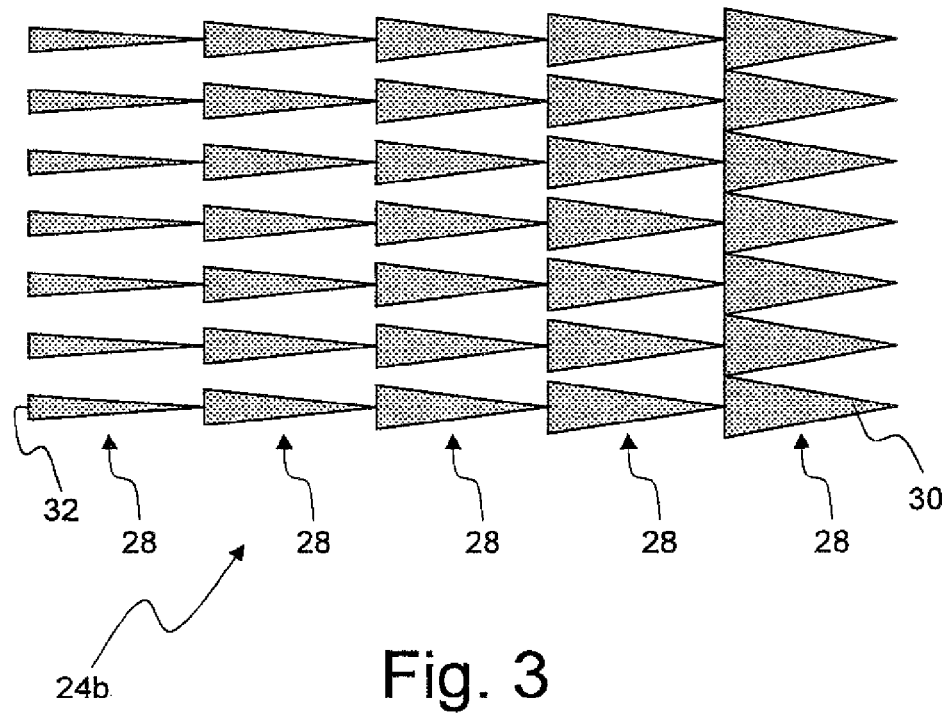
FIG. 3 shows a schematic plan view of a BLACES grating, which is suitable for homogeneous coupling of light out of the plane plate.

An excerpt of such an output grating 24b for the right eye 26b is represented in a plan view in FIG. 3. In this output grating 24b the base side 32 of the isosceles triangle, which forms the base surface of the prisms of the individual substructures 30, becomes constantly smaller from right to left in the drawing i.e. towards the middle of the plane-parallel plate 18, so that the individual substructures 30 of the diffraction structures 28 lying further to the left along the lengthwise direction of the diffraction structures 28 are spaced increasingly further apart from one another. The maximum fill factor of the diffraction structures 28 thus decreases from right to left. The diffraction structures 28 lying further to the right therefore have a steeper blaze edge than those lying further to the left. With a suitable configuration of the parameters by a person skilled in the art, the diffraction efficiency of the grating can therefore be varied and a uniform intensity of the light coupled out can be achieved over the entire width of the output grating 24b.

An output grating 24b equivalent thereto could, for example, also have differently high prisms as individual substructures 30. For production regions, however, the previous arrangement is to be preferred since it can be produced with only one coating in a process cycle.

Although certain optical display devices have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An optical display device comprising:
   a) an essentially planar light guide;
   b) an image-generating system;
   c) a first diffraction grating by which light that comes from the image-generating system can be coupled into the light guide; and
   d) a second diffraction grating by which the light can be coupled out again from the light guide; wherein
   e) at least one of the two diffraction gratings is a binary-blazed grating having a multiplicity of diffraction structures, which
      essentially extend mutually parallel,
      have a width g perpendicular to their lengthwise direction which is greater than the effective wavelength of the light that comes from the image-generating system, and
      are composed of a multiplicity of individual substructures that ensure a blaze effect and have a maximum dimension p in the lengthwise direction of the diffraction structures which at least on average over a diffraction structure is less than the wavelength of the light, and
   wherein the diffraction structures respectively include a row of individual substructures along a lengthwise direction, which in plan view have the shape of a closed geometrical surface whose dimension directed parallel to the lengthwise direction of the diffraction structures varies in a direction perpendicular to the lengthwise direction of the diffraction structures, and which have a maximum dimension in the direction perpendicular to the lengthwise direction of the diffraction structures, which is greater than the wavelength of the light.

2. An optical display device according to claim 1, wherein the individual substructures vary from one diffraction structure to another diffraction structure so that their shape, their maximum dimension p in the lengthwise direction of the diffraction structures and/or their spacing along the lengthwise direction of the diffraction structures varies.

3. An optical display device according to claim 2, wherein between one diffraction structure and another diffraction structure, the maximum dimension p of the individual substructures in the lengthwise direction of the diffraction structures decreases to the extent that their spacing along the lengthwise direction of the diffraction structures increases.

4. An optical display device according to claim 1, wherein the individual substructures have different profile depths from one diffraction structure to another.

5. An optical display device according to claim 1, wherein the individual substructures, of which the diffraction structures are composed, all have the same height h.

6. An optical display device according to claim 1, wherein the optical display device is part of a head-mounted display.

7. An optical display device according to claim 1, wherein the optical display device is part of a head-up display.

* * * * *